(12) United States Patent
Ahmavaara

(10) Patent No.: US 7,551,576 B2
(45) Date of Patent: Jun. 23, 2009

(54) ACCESS SYSTEM FOR AN ACCESS NETWORK

(75) Inventor: Kalle Ahmavaara, Espoo (FI)

(73) Assignee: Nokia Corporation, Espoo (FI)

( * ) Notice: Subject to any disclaimer, the term of this patent is extended or adjusted under 35 U.S.C. 154(b) by 934 days.

(21) Appl. No.: 10/467,276

(22) PCT Filed: Oct. 26, 2001

(86) PCT No.: PCT/EP01/12455

§ 371 (c)(1), (2), (4) Date: Aug. 6, 2003

(87) PCT Pub. No.: WO02/063900

PCT Pub. Date: Aug. 15, 2002

(65) Prior Publication Data

US 2004/0068571 A1 Apr. 8, 2004

(30) Foreign Application Priority Data

Feb. 6, 2001 (WO) .................. PCT/EP01/01271

(51) Int. Cl.
*H04W 4/00* (2006.01)
(52) U.S. Cl. .................. 370/328; 370/401; 455/422.1
(58) Field of Classification Search ............... 370/328, 370/352, 356, 401, 419; 455/422.1, 424, 455/432.1, 437
See application file for complete search history.

(56) References Cited

U.S. PATENT DOCUMENTS 6,243,581 B1 * 6/2001 Jawanda ............... 455/432.2
6,374,112 B1 * 4/2002 Widegren et al. ....... 455/452.2
6,636,502 B1 * 10/2003 Lager et al. ............... 370/352
6,687,243 B1 * 2/2004 Sayers et al. ............. 370/356
6,693,894 B1 * 2/2004 Andersson et al. ........ 370/352
6,853,627 B1 * 2/2005 Evans ...................... 370/312
7,039,025 B1 * 5/2006 Menon et al. ............. 370/328

(Continued)

FOREIGN PATENT DOCUMENTS

WO    WO 99/52307    10/1999

(Continued)

*Primary Examiner*—Hassan Kizou
*Assistant Examiner*—Jeffrey M Rutkowski
(74) *Attorney, Agent, or Firm*—Squire, Sanders & Dempsey L.L.P.

(57) ABSTRACT

The present invention relates to a method, system and device for providing access from a terminal device (1) to a second access network (8). To achieve this an access network device (3) belonging to an first access network (12) stores a second access network information comprising information of second access network(s) (8) accessible from the first access network (12). Communication means between the terminal device and and the first access network are established and the second access network information is delivered to the terminal device (1). The terminal device (1) accesses the second access network (8) via the first access network (12). The accessing is done based on the second access network information delivered to said terminal device (1). Thereby, service functions of the second access network, e.g. UMTS services, can be distributed via any other access network and existing broadband or high-speed access networks can be implemented in new cellular network structures. A huge capacity enhancement can thus be offered to the network operators of the cellular network without any standardization effort or license fee and at very small investment and maintenance costs.

44 Claims, 5 Drawing Sheets

U.S. PATENT DOCUMENTS

Figure 1:
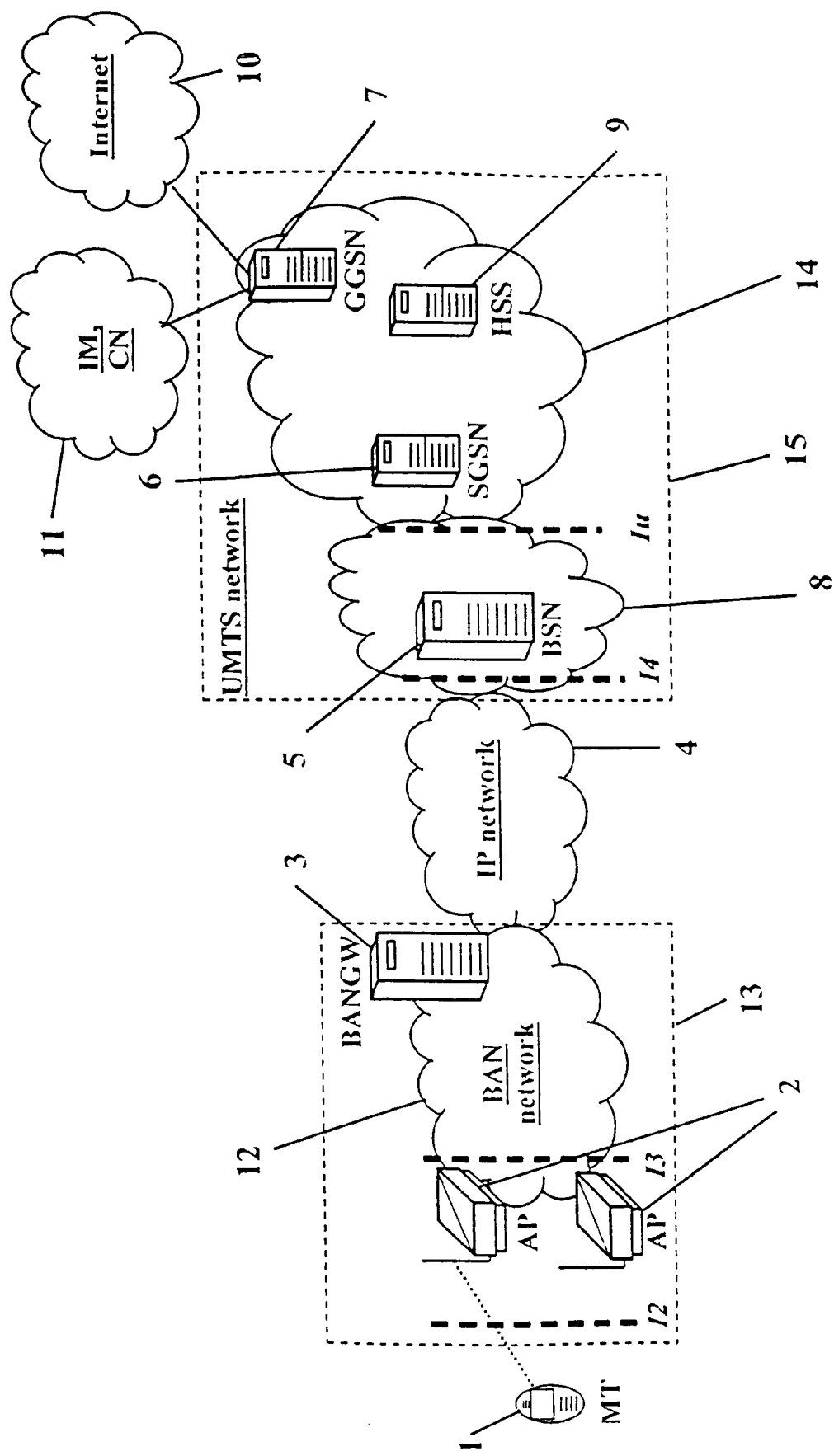

| | | | |
|---|---|---|---|
| 7,099,339 B1 * | 8/2006 | Wang et al. | 370/401 |
| 7,149,229 B1 * | 12/2006 | Leung | 370/466 |
| 2002/0085516 A1 * | 7/2002 | Bridgelall | 370/329 |
| 2002/0147008 A1 * | 10/2002 | Kallio | 455/426 |
| 2003/0039237 A1 * | 2/2003 | Forslow | 370/352 |
| 2003/0202521 A1 * | 10/2003 | Havinis et al. | 370/401 |

FOREIGN PATENT DOCUMENTS

| | | |
|---|---|---|
| WO | WO 99/66742 | 12/1999 |
| WO | WO 00/69186 | 11/2000 |
| WO | WO 00/72572 | 11/2000 |
| WO | WO 00/76138 | 12/2000 |
| WO | WO 01/13660 A1 | 2/2001 |

\* cited by examiner

ACCESS SYSTEM FOR AN ACCESS NETWORK

FIELD OF THE INVENTION

The present invention relates to a method and system for providing access to a second access network, such as a cellular network e.g. Universal Mobile Telecommunications System (UMTS) network, via an access network which is not designed to be used as a part of the second access network.

BACKGROUND OF THE INVENTION

Data services of the Global System for Mobile communications (GSM) have launched a new era of mobile communications. The early analog cellular modems had become unattractive to the market as they were slow and unreliable. Now the market for data is moving onwards (more bursty) and upwards (more traffic), and the standardization institutes are working towards higher data rates but more significantly also towards packet data services. This will certainly broaden the appeal to end users because data is routed more efficiently through the network and hence at lower costs, and also access times are reduced.

The fixed networks have seen an enormous growth in data traffic, not least because of the growth of Internet access demand. It is supposed that mobile networks will spread as technology and customer expectations move on. The current GSM switch network is based on narrow band ISDN (Integrated Services Digital Network) circuits, so that the reason for rate limitations moves from the access network to the core network.

The new General Packet Radio Services (GPRS) network will offer operators the ability to charge by the packet, and support data transfer across a high speed network at up to eight times slot radio interface capacity. GPRS introduces two new nodes into the GSM network, a Serving GPRS Support Node (SGSN) and a Gateway GPRS Support Node (GGSN). The SGSN keeps track of the location of the mobile terminal within its service area and sends and receives packets to/from the mobile terminal, passing them on or receiving them from the GGSN. The GGSN then converts the GSM packets into other packet protocols (e.g. IP or X.25) and sends them out into other networks.

Services like multislot data and GPRS are very useful in moving the base technologies forwards, but if the same goals can be achieved with the existing data services, services on the current networks should be prototyped. Therefore, a standardized mobile access mechanism for fixed network services, focusing on increasing the effective throughput and immunity to dropped calls and thus reducing the needed airtime should be established. UMTS will deliver advanced information directly to people and provide them with access to new and innovative services. It will offer mobile personalized communications to the mass market regardless of location, network or the terminal used.

Cellular radio frequencies are usually owned as licensed bands by the network operators. The huge licensing fees lead to rigid licensing procedures which make it difficult to maintain a healthy and non-discriminatory competition environment. Currently, a strictly separate usage of owned access resources by individual network operators can be observed. Hence, ownership of frequency bands or spectrum is considered to be a key factor of success for the operator's business.

To achieve a wide area coverage at increasing amounts of network traffic, smaller cell sizes are required, which makes network planning more and more difficult and leads to increasing site acquisition costs and radio access network investments. Moreover, huge and rigid standardization efforts are required to introduce new access systems.

However, given the massive investments that have been made in existing networks of all types and the enormous capital value that still attaches to most of them, operators and users will wish to continue to exploit them until the end of their useful lives.

Almost all existing networks can be used as access networks for IP-based services. Therefore, interoperability between UMTS terminals and other IMT-2000 (International Mobile Telecommunications-2000) network family members, or even non-UMTS access networks is a key requirement. In particular, UMTS operators should be able to use common access networks owned by other access network providers, while the user has subscription only with the UMTS operator.

SUMMARY OF THE INVENTION

It is therefore an object of the present invention to provide a method and system for providing access to a second access network, by means of which access facilities can be increased.

This object is achieved by a method of providing access from a terminal device to a second access network, the method comprising the steps of:
   storing second access network information in an access network device belonging to a first access network, said second access network information comprising information of second access network or second access networks accessible from the first access network;
   establishing communication means between said terminal device and the first access network;
   delivering the second access network information from said access network device to said terminal device; and
   accessing the second access network via the first access network, said accessing done based on the second access network information delivered to said terminal device.

Furthermore, the above object is achieved by a system for providing access from a terminal device to a second access network, the system comprising:
   an first access network for providing communication means for the terminal device; and
   an access network device belonging to the first access network. Said access network device is arranged to store and deliver second access network information to the terminal device. Said second access network information comprises information of second access network or second access networks accessible from the first access network. Furthermore; the second access network information comprises information enabling the terminal device for accessing said second access network via said first access network.

Moreover, the above object is achieved by an access network device for enabling access from a terminal device connected to a first access network, to a second access network, the access network device is arranged to:
   store said second access network information; and
   deliver said second access network information to the terminal device, said second access network information comprising information of second access network(s) accessible from the first access network. The second access network information enables the terminal device to access said second access network via said first access network.

Throughout the present application, the term "first access network" is intended to designate any independent access network, non-integrated access network and/or external access network which is not specifically adapted to be used as a part of the second access network which is to be accessed. This means e.g. that the access technology of the first access network is not specifically designed to be used as a part of the accessed second access network. The first access network may be based on non-licensed technology in such fashion that it may be shared by e.g. different second access network operators to provide access to their second access networks. The first access network may be connected to the second access network in an add-on way, i.e. by preserving major characteristics of the first access network and the second access network, respectively, as defined by existing standards and specifications. For example, an first access network operating in an unlicensed band typically is different in its characteristics from a second access network operating in a licensed band. Moreover, protocol standards or signalings may differ in some or all protocol layers.

Accordingly, a system concept for a second access network is provided, in which independent access networks can be used as alternative radio access facilities for accessing the second access network. The second access network is preferably cellular network, e.g. an access network of UMTS network, UTRAN, GERAN or IP RAN which are specified in 3GPP specifications. Thereby, seamless access to all services of the second access network can be provided over various radio access systems. As an example, a UMTS over broadband radio system can be established, which supports seamless access to all UMTS services and will deploy UMTS mobility management principles.

The second access network is accessed via a service node belonging to the second access network. The access may be established by establishing an connection between the terminal device and the service node. Said connection between the terminal device and the service node is an IP connection between two nodes identified by their IP addresses or ethernet level connection i.e. a connection between two nodes identified by their ethernet addresses, or similar transport connection based on some other transport trechnology. In the following text term 'IP connection" is used as an example of such a connection.

The terminal device is connected to the first access network via an access device which belongs to the first access network. The establishing of communication means comprises an establishment of the radio interface connection between the terminal device and the access device. When the communication means has been established between the terminal device and the first access network (this means that the terminal device has e.g. a radio interface connection with the access device) an IP address is allocated to the terminal device.

The second access network information comprises a list of PLMN-IDs of accessible second access networks, IP address of the service node and/or a system information package from each accessible second access network. This second access network information is delivered from an access network device located in the first access network to the terminal device. After the delivery of second access network information the terminal device or the user of it may decide which second access network is to be accessed. The system information package contains system information required to be known by the terminal device about the second access network or/and the networks behind second access network before accessing second access network.

The access network device may automaticallly deliver the second access network information to all terminal devices that are establishing communication means with the first access network. Alternatively the terminal devices may request or solicitate for the second access network information and the information is delivered as a response. Request of the second access network information can be realised e.g. by a service discovery protocol or by DHCP (dynamic host configuration protocol) protocol. The access network device comprises memory for storing the second access network information received from the second access network or from the networks beyond the second access network (e.g. core network of cellular systems). The second access network device is also arranged to receive a second access network information from the second access network.

Accessing the second access network happens by establishing the IP connection with the service node of the second access network. Using this IP connection the radio resource control (RRC) connection may be established between the terminal device and the service node. This means that the RRC connection is established on top of the IP connection. The established IP connection is active at least as long as the terminal device is in the coverage area of the first access network.

A handover of access devices may be executed by establishing communication means with another access device and sending a signaling message, such as cell update, to the service node. The same IP connection may be used because the terminal device can maintain its old IP address and the service node has not been changed.

Furthermore an inter system handover may be executed by establishing communication means between the terminal device and an access device of the new first access network and allocating new IP address to the terminal device. The inter system handover further comprises steps of, delivering the second access network information to the terminal device and sending a signaling message, such as cell update, to the new service node from the terminal device.

In the inter system handover, after reception of the signaling message in the new service node a serving radio network subsystem relocation may be executed between the old service node and the new service node.

The data transmitted between the terminal device and the second access networks comprises protocol data units (PDU) specified in 3GPP specifications. Preferably these protocol data units are radio link control (RLC) data units also specified in 3GPP specifications. In one embodiment of the invention the data units are multiplexed into data stream between the the second access network and terminal device by a multiplexing protocol. Also multiplexing protocol may be one specified in 3GPP specifications. The protocol data units are transported over the first access network via a UDP/IP tunnel.

The terminal devices are mobile terminals, mobile phones, multimode mobile phones, PDA devices, portable or fixed computers, lap tops or some other devices that can be used for accessing the first access network. In this application either terminal device or mobile terminal is used to designate any of the above mentioned apparatuses.

This provides to the users of mobile terminals the advantages that a very convenient high-speed wireless system for home, office and other hot-spot environments can be established, such that attractive public wireless services can be provided at reasonable prices. Furthermore, the same type of service can be used at any location, since cheap and fast hot-spot systems can be handed over to the global second access network umbrella and leaving a hot-spot.

Due to the transparent connection through the first access network, the GSM/UMTS security functions can be moved to new wireless devices. The user can rely on secure payments and other confidential transactions provided by the familiar operator over the new system and thus may start to use e-commerce. Thus, any UMTS service can be provided globally via any compatible access network.

As regards network operators, an easy way is provided to become a major wireless Internet service provider. In particular, a huge capacity enhancement can be offered without major new technology developments or standardization efforts and license fees, while only very small investments and maintenance costs are required for the additional service nodes. Thereby, access costs are reduced for the network operators, since common access networks can be shared by different operators. Moreover, even different radio technologies may be used to access the same services, while the best radio technology may be chosen for each environment. The operator can concentrate on the core business which has the best margins and may leave the broadband access handling to other parties. The role of the backbone service provider is thereby separated from the role of the access provider, and more modular system structures can be developed with radio access systems being more separated from the remaining network infrastructures.

Additionally, a new type of business is generated for the provision of first access networks, which is performed by the owners of existing and future access networks. Additionally, the access devices become consumer products rather than parts of an invisible first access network infrastructure, since the access providers have to install corresponding access devices for providing the transparent connection through their access or distribution networks. The network terminals may be arranged as specific terminals adapted to their point of use, or as dual or multimode terminals which can be used in any environment.

Thus, the new access system offers on one hand operators the possibility to extend their service offering to new environments like homes or public hot-spots and on the other hand it dramatically increases the radio capacity available for future cellular services. The system can be used as a UMTS capacity enhancement and as a low cost and high bit-rate radio extension e.g. in homes or indoor or outdoor hot-spot areas where utilization of low cost and high bit-rate services and continuous reachability from the UMTS backbone network is desired. Thereby, seamless access to all UMTS services can be provided, and the access networks can be introduced as alternative or additional radio access technologies for UMTS.

The higher layer protocol functions of the terminal device may be based on UMTS protocol functions that operate on top of the UMTS transport channels in the UMTS protocol architecture.

Preferably, IP based transport means, e.g. UDP/IP is setup between the terminal device and the service node of the second access network. The first access network may be connected to the second access network by connecting the access network device and the service node of the second access network to each others by a network which enables IP transport between the service node and the access network device. Alternative implementations for connecting the first and second access networks are however possible. For example, the access network device and the service node of the second access network may be implemented either close to each other or in the same network element so that the access network device and the service node may be connected to each others by a single cable.

As regards the billing function, at least one of said access devices or another network device of the first access network may be arranged to monitor resource usage by an active connection between the terminal device and the second access network and to report monitoring results to the centralized network device or gateway device arranged to sort the resource usage according the originating second access network and to increase an access resource charging bill for the operator of the originating second access network according to predetermined rules.

The service node may distribute information of the second access network or cellular network such as system Information and/or routing information to the gateway device, and the gateway device may then distribute the system information to terminal devices.

In particular, for the established communication between the terminal device and the second access network via the first access network, the service node may provide predetermined functions of the second access network, comprising radio bearer management, encryption, IP-header compression, RLC level segmentation and/or retransmission, and MAC (Medium Access Control) multiplexing. It may be split into a separate user plane gateway and control plane servers. Furthermore, the service node can be connected to an SGSN, MSC or an other second access network node by a standard Iu interface and/or to other service or switching nodes by an Iur signaling interface for supporting seamless inter service node and inter access system handovers.

The first access network may be a network, e.g. a broadband radio access network, arranged separately from the communication system on which the second access network is based on. It may be used for accessing several types of the second access networks, e.g. a UMTS infrastructure network. The first access network may use OFDM (Orthogonal Frequency Division Multiplexing) based radio technology in the air interface between the access device and the terminal device. Furthermore, the first access network may be arranged to use wireless local area network (WLAN) like radio technologies such as Bluetooth® (hereinafter as BT), IEEE 802.11a/b, IEEE 802.15, or BRAN HL2 based radio technology. Additionally, the first access network may be arranged to be used for establishing a connection to other types of networks which differ from the second access network. It may provide alternative methods specific to the first access network so as to realize lower layer protocol functions of second access networks specifically designed to be used as a part of the second access network. Specifically, the first access network may be a multipurpose access network adapted to offer transport services for the second access network, and the second access network may be an access independent network adapted to be able to utilize transport services provided by several types of first access networks.

The terminal device may be arranged to scan the signal strength of other access devices and to perform handover by starting a connection establishment procedure towards a new access device. As regards the data transport functions of the first access system, transport channel data streams of the second access network may be transported on top of IP transport between the terminal device and the second access network via the first access network. IP can be transported on top of the communication channels provided by the access technology of the first access network between a terminal device and the first access network.

The first or/and the second access network may provide a mapping function for mapping a desired service quality to the transport bearer/communication channel characteristics of the access network.

A signaling specific to the second access network may be carried out via the established IP connection or transport bearer transparently through the first access network which is arranged to only allocate the respective capacity.

The terminal device may be arranged to use its power saving features specific to the first access network when being connected to the second access network via the first access network. The power saving features designed and implemented for the second access network may be disabled for terminal devices connected via the first access network to the second access network.

When the connection is set up, a set of lower layer functions of the second access network may be disabled and the corresponding functions of the first access network may be used instead. An identity utilized by the second access network for the user of the terminal device and/or for the terminal device itself does not have to be notified to the first access network. The terminal device may be arranged to establish a new connection with the first access network, which is not associated with the previous connection by the first access network, when the terminal device moves from the coverage or cover area of one access device to the coverage or cover area of another access device of the first access network.

Figure 2:
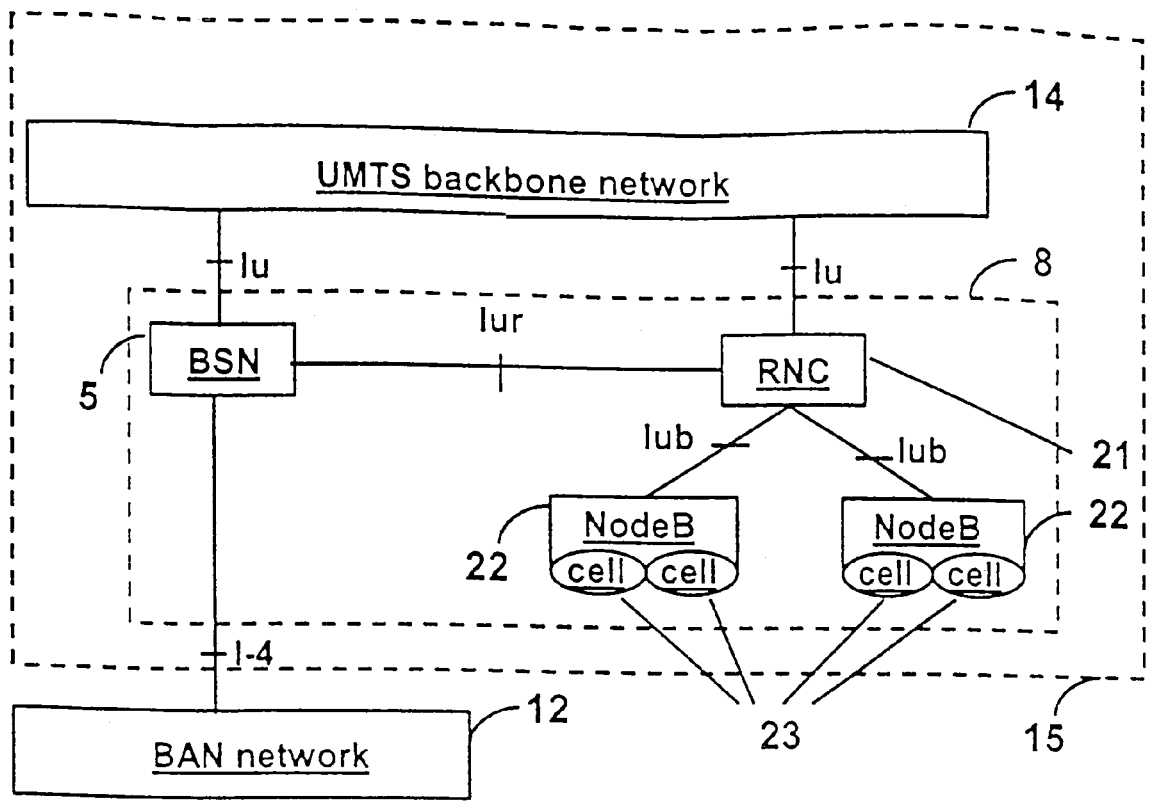
Figure 3:
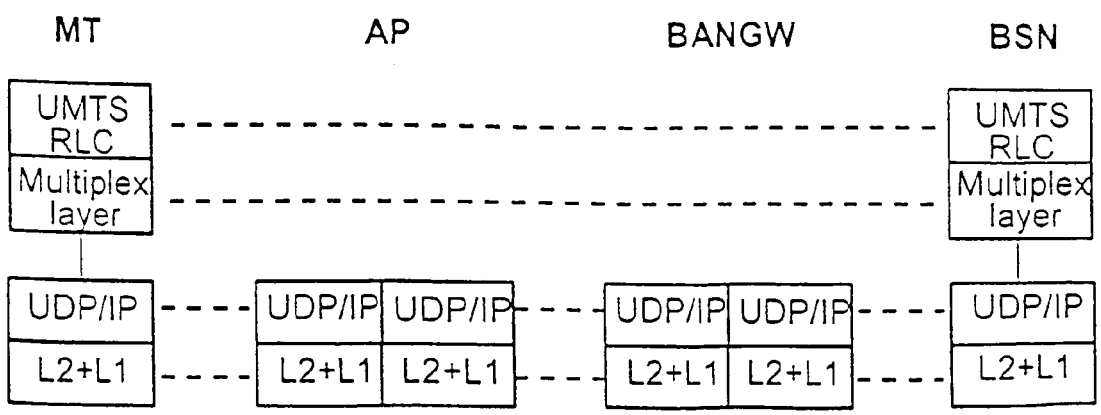
Figure 4:
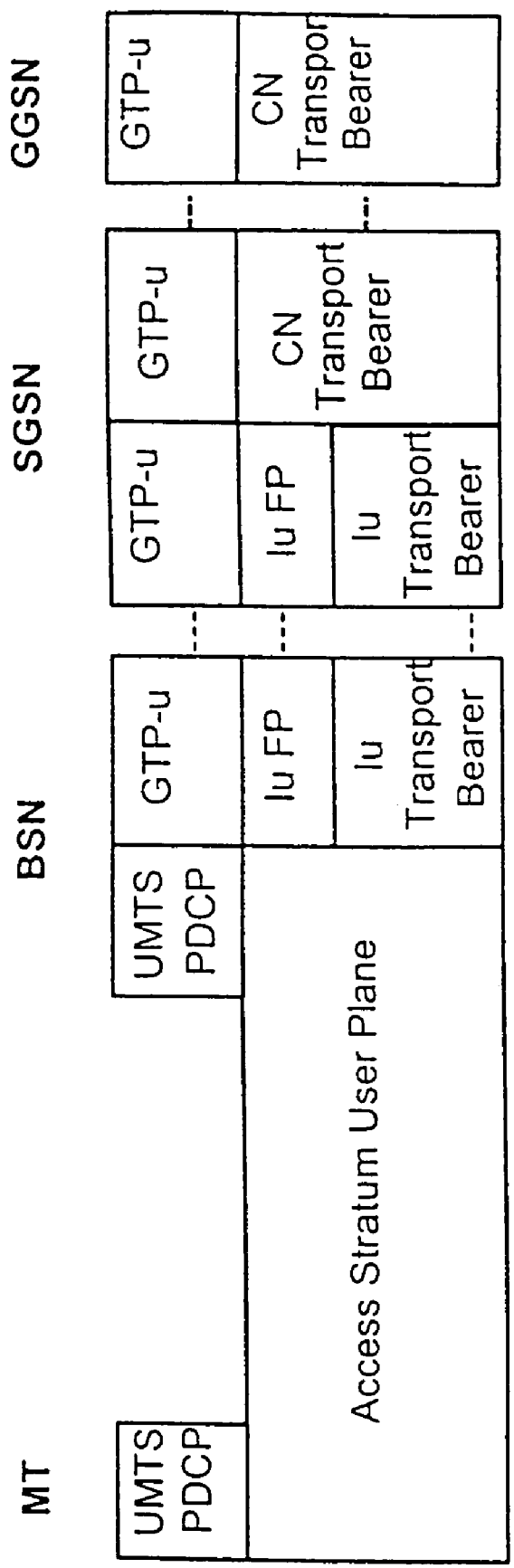
Figure 5:
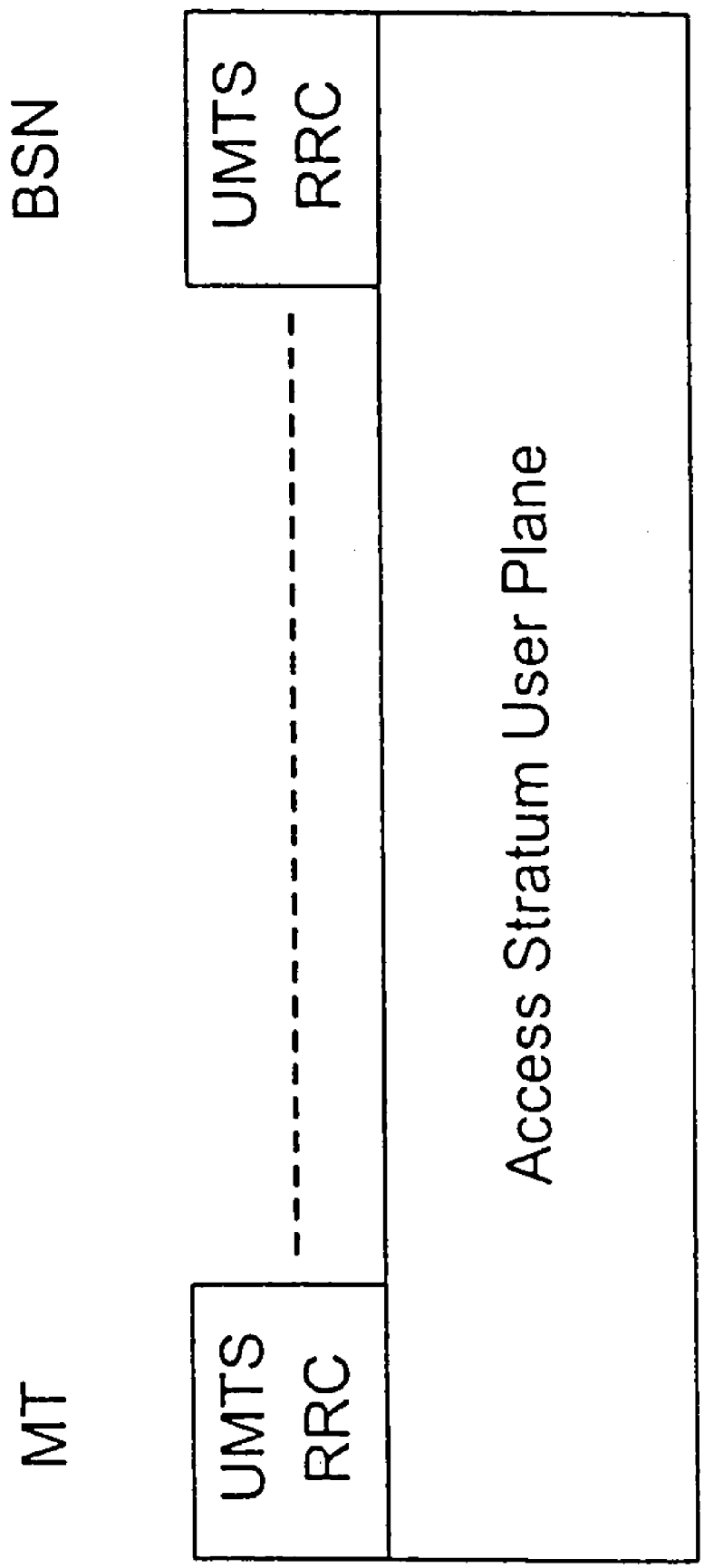
Figure 6:
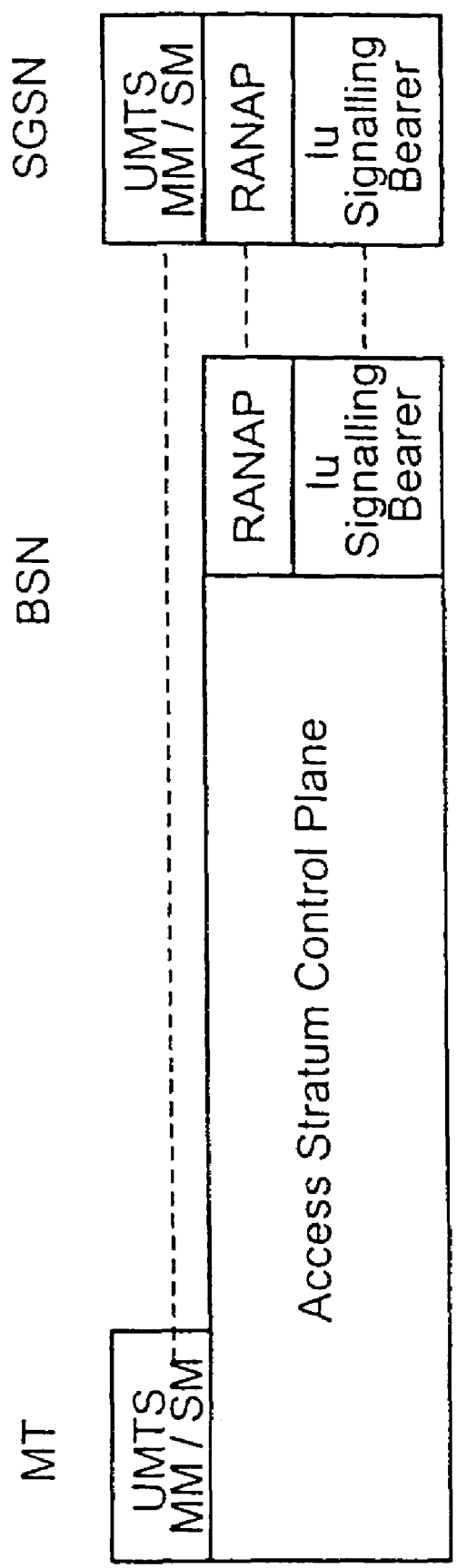

In the following, the present invention will be described in greater detail on the basis of a preferred embodiment with reference to the accompanying drawings, in which:

FIG. 1 shows a schematic block diagram of a network configuration comprising an access system according to the preferred embodiment, FIG. 2 shows a schematic block diagram of an example of the second access network, FIG. 3 shows protocol stacks of the air interface with respect to the UMTS Access Stratum User Plane, FIG. 4 shows protocol stacks of the air interface with respect to the UMTS Non Access Stratum User Plane, FIG. 5 shows protocol stacks of the air interface with respect to the UMTS Access Stratum Control Plane, and FIG. 6 shows protocol stacks of the air interface with respect to the UMTS Non Access Stratum Control Plane.

DESCRIPTION OF A PREFERRED EMBODIMENT

In the following, a preferred embodiment of the method and system according to the present invention will be described on the basis of a wireless broadband UMTS based system in which independent broadband wireless access networks are introduced as alternative or additional radio access technologies for UMTS. Thus, such a UMTS over broadband radio system supports seamless access to all UMTS services.

In these preferred embodiments of the invention the second access network 8 is UMTS terrestrial radio access network (UTRAN) and the first access network 12 is broadband access network (BAN network). It should be noticed that instead of UTRAN the second access network may be any other access network, e.g GSM/EDGE radio access network (GERAN) or IP RAN (IP based radio access network).

FIG. 1 shows a schematic diagram of the network architecture according to a preferred embodiment, wherein a broadband access provider network (BAN provider network) 13 is connected via IP (Internet Protocol) network 4 to a UMTS network 15. The UMTS network 15 comprises the UMTS access network (UTRAN) 8 and a UMTS backbone network 14. In more detail the IP network 4 is a network where IP transport is utilised between the UTRAN 8 and BAN network 12. The access system is usable for UMTS radio capacity enhancement in environments suitable for broadband radio. According to FIG. 1, the access system comprises one or a plurality of UTRANs (second access networks), 8 operated by a UMTS operator, and one or a plurality of broadband access networks (BAN networks) 12 which are operated by access network providers. Thus, the BAN networks 12 can be regarded as non-integrated or independent or external access networks. The BAN network 12 may be based on a non-licensed radio technology and a common BAN network 12 can be shared between UMTS network 15 operators. In particular, the UTRAN 8 comprises an Iu interface with the UMTS backbone network 14 and a simple IP based interface 14 with the BAN network 12 (non-integrated access network), wherein only data and control information transport services are provided by the interface 14.

The BAN network 12 consists of access devices called access points (APs) 2 for providing a radio access by establishing a radio-connection (dotted line between MT 1 and AP 2 shown in the FIG. 1) to a terminal device 1 which in these examples is called mobile terminal (MT) 1. Furthermore, a control server or gateway device called BAN gateway (BANGW) 3 acts as a distributor for control signaling between mobile terminal(s) and the UTRAN 8. Thus, the access points 2 terminate the broadband radio interface. The BANGW 3 is arranged to hide the internal logical structure of the BAN network 12 from external networks.

Access point 2 contains following functionalities:

Management of air interface 12 connections between itself and mobile terminal 1 according to the access specifications, Standard bridging (based on link layer address) or routing (based on network layer address) of air interface data streams to/from connected network nodes.

BAN gateway 3 is the data transmission gateway between the AP 2 on one side and UTRAN 8 on the other side. BANGW 3 functions desribed here as functions of one node can be realised in separate logical and/or physical nodes having different names than BANGW 3.

BANGW 3 is also responsible for the IP address allocation for accessing MTs 1 and storage and delivery of second access network information, now called UMTS network information to connecting MTs 1. BANGW 3 also receives and stores information of connected UTRANs 8 as provided by the UMTS network 15. Other functions of BANGW 3 are: delivery of the UMTS network 15 information to MTs 1 accessing the BAN network 12, routing data between APs 2 and UTRAN 8, and collecting resource usage accounting information from the traversing UMTS data streams and reporting the information to a accounting server e.g. by AAA (authentication, authorization, and accounting) protocol.

The BAN gateway 3 communicates as a client with the BSN 5 by using the access network control protocol (ANCP) provided for BAN control from UMTS network 15. Thereby, a security association can be established between the BAN gateway 3 and the BSN 5. ANCP protocol function is to deliver the UMTS network information from one UTRAN 8 to BAN gateway 3.

The interface between the BAN gateway 3 and the access points 2 is called I3 interface. Furthermore, the interface between the access points 2 and the mobile terminal 1 is called I2 interface. The I2 interface is an air interface which consists of two parts, a UMTS part and an access specific part. The UMTS part is terminated in the BSN 5 or beyond and the access specific part is terminated in the respective access point 2. An access point 2 may communicate with one or several mobile terminals 1.

The access specific part of the interface I2 complies with the broadband radio technology lower layer, e.g. physical and MAC layer of WLAN (Wireless Local Area Network) access technologies. In the UMTS part, the higher layers are defined for UMTS L2 (e.g. RLC, PDCP) and L3 (RRC, MM, SM), while certain restrictions for the usage of UMTS protocols over the access systems may be implemented. The UMTS specific part is transparent to the access points 2. Lower layer signaling may be established between the mobile terminals 1 and one of the access points 2, and a higher layer signaling may be established between the mobile terminals 1 and the BSN 5 via the BAN network 12.

The BAN network 12 is connected to a logical UTRAN element or service node called Broadband Service Node (BSN) 5 which is added to the UTRAN 8 to provide an interface functionality towards the BAN network 12. The function of the BSN 5 corresponds to a Serving RNC (Radio Network Controller) of the UTRAN 8. However, the BSN 5 may not be arranged to manage BAN radio resources, the conventional Iub interface is replaced by the above mentioned simple I4 control interface towards the BAN network 12, and BSN 5 communicates with the mobile terminal 1 via the BAN network 12 over interface I2. The functions of the BSN 5 include: running Radio Resource Control (RRC) signalling protocols defined for UTRAN 8 and as restricted by the rules of RRC usage over BAN network, multiplexing higher layer UMTS data streams (such as logical channels or transport channels) to IP based transport bearers (e.g. UDP/IP tunnel) to/from BAN network, radio bearer management, UMTS encryption, UMTS IP header compression, and UMTS RLC (Radio Link Control) level segmentation and retransmission. Optionally the functions of BSN may include collection of BAN network 12 resource usage accounting information for checking the charging from BAN provider. It is noted that, due to its non-licensed radio technology, the BAN network 12 may be shared by several UTRANs 8. Further it is noted that one BAN network can be connected to several BSNs 5 in one or several second access networks 12, provided by one or more operators), and the BSN 5 may be connected to one or several BAN networks 12 provided by one or several BAN providers.

Furthermore the BSN 5 may be split into separate user plane gateway and control plane server functions. The BSN 5 is connected to an SGSN 6, MSC or/and other cellular system node of a core network via a standard Iu interface and may be connected to other BSNs 5 and RNCs 21 (shown in FIG. 2) by Iur signaling interfaces for supporting seamless inter BSN 5 and/or inter access system handovers. Furthermore, the UMTS backbone network 14 comprises a GGSN 7 which provides a gateway function to the Internet 10 or other external networks 11 like e.g. corporate networks (CN) or IP-based multimedia networks (IM). Additionally, a home subscriber server (HSS) 9 is provided as a subscriber data base for storing subscriber specific information. The function of the HSS 9 corresponds to the function of the home location register (HLR) of a circuit switched network environment. MT 1 is a terminal having the UMTS higher layer protocol entities. In addition MT has access specific lower layer protocols and means for mapping the transport channels from UMTS part of the protocol stack to the channels provided by the access specific lower layers. Preferably the MT 1 is a dual mode terminal, capable for connecting to UMTS either by integrated access within the second access net-work (UTRAN, GERAN or All IP RAN) and via BAN network 12 based e.g. on Bluetooth ® or WLAN radio technology.

When connected via BAN network 12 mobile terminal 1 functions can be summarized as follows:

Execution of UMTS higher layer signalling protocols and communication by them with UTRAN 8 as defined in 3GPP ($3^{rd}$ Generation Partnership Project) specifications. These protocols are e.g. Session Management and UMTS Mobility Management.

Operating the SIM (subscriber identity module) card as specified in 3GPP specifications.

Execution of a limited functionality UMTS user plane protocols and communicating by them with UTRAN 8 as defined in 3GPP specifications and restricted by rules of executing those protocols over BAN network 12. These protocols include packet data convergence protocol (PDCP) and RLC.

Execution of a limited functionality UTRAN RRC protocol as defined in 3GPP specifications and restricted by rules of its execution over the BAN network 12.

Operating the BAN network 12 specific (e.g. based on WLAN or Bluetooth® radio technology) lower layers protocols according to their radio specifications.

Multiplexing data streams between higher layer UMTS protocols (transport channels) and UDP/IP based communication means towards UTRAN 8.

FIG. 2 shows an architecture of the UTRAN 8. The BSN 5 node is connected to the UMTS backbone network 14 (also known as core network) using the Iu interface as explained earlier. Further the BSN 5 is connected to other radio network controllers (RNCs) 21 via Iur interface. These network controllers may be also base station controllers (BSC) or some elements of IP RAN. RNC is further connected by Iub interface to Node Bs 22 which are normal base stations covering one or more cells 23 with radio coverage. It should be noticed that the Iur interface may connect also other types of second access networks in each other, e.g. GERAN, UTRAN and IP RAN.

Further the FIG. 2 shows once again the interface I4 between BSN 5 and BAN network 12 as explained already earlier in this application. It should be also noticed that the BSN 5 may be implemented as a standalone node (like in the FIG. 2) or as well as an logical entity in the same physical device where logical entity RNC 21 (or BSC of GERAN, or some controller/gateway/base station device of IP RAN) is implemented.

When the mobile terminal 1 comes to the coverage area of a BAN network 12 from where connection to UTRAN 8 is available, MT 1 establishes a connection with an access point 2. The availability of the UMTS connection from the specific BAN network 12 may be either known by the user in priori, or the knowledge of the availability of UMTS connectivity from a certain BAN 12 network can be preconfigured to the MT 1.

After the radio connection establishment to the AP 2, an IP address is allocated to the MT 1. When the IP address has been allocated, the second access network information is delivered from BANGW 3 to the MT 1. In this embodiment of the invention this information contains a list of accessible PLMN-IDs (public land mobile network identifiers), the IP addresses of corresponding service nodes BSNs 5 as well as a UMTS system information package from each PLMN.

BANGW 3 can automaticallly deliver the UMTS Access Information to all accessed MTs 1 or MTs can specifically request or solicitate for UMTS Access Information and the information is delivered as a response. Request of UMTS access Information can be realised e.g. by a service discovery protocol or by DHCP protocol.

MT 1 can decide on the most suitable PLMN-ID, based on the network selection principles defined for UMTS. After PLMN selection MT 1 establishes RRC connection with corresponding BSN 5. In the preferred embodiment of the invention the RRC connection is implemented on top of an IP connection. MT 1 triggers this by sending a specific message to the BSN 5. For data transfer between BSN 5 and MT 1 the corresponding IP addresses are used. Registered port numbers are used to differentiate the UMTS traffic from other traffic. Potentially different port numbers are used to identify different UMTS data streams such as logical or transport channels. All UMTS data streams are multiplexed to the same IP connection.

After establishment of the IP connection, it is maintained as long as the MT 1 is within the coverage of the AP 2 of the BAN network 12. For power saving, the sleep modes provided by the used access technology can be used. BSN 5 and MT 1 can always reach each other via the existing IP connection between them.

MT 1 measures the signal strength from the connected AP 2 and from possible neighboring APs 2. If a stronger AP 2 is found and if it belongs to the same BAN network 12 or access zone within the BAN network 12 indicated by the broadcasted network name, the MT 1 can make a handover by abandoning the old connection and setting up radio connection with the new AP 2 and directly sending Cell Update to the BSN 5 while maintaining its old IP address. If the new AP 2 does not belong to the same access zone or BAN network 12, i.e. it broadcasts a different network name, the MT 1 must acquire new IP address before sending the Cell Update to BSN 5.

Handovers to UTRAN network 8 are realised as Cell Updates or as prepared normal 3GPP intersystem handovers to UTRAN 8 in case the MT 1 is capable of measuring UTRAN carriers when connected via BAN network 12.

UMTS network 15 parts handle the UMTS identifiers of mobile terminals 1 and mobile terminal users. The BAN network 12 takes care of only routing of data between MT 1 and UTRAN 8, this is done by respective IP addresses and UDP (user datagram protocol) port numbers. In addition the MT 1 and the AP 2 use access specific identifiers to identify each other.

The identification at UMTS level is similar to the one used when accessing UMTS directly via the UTRAN 8 access network. Mobile Terminal 1 has its IMEI (international mobile station equipment identity) and the subscriber is identified by IMSI (international mobile subscriber identity) and the temporary identifier TMS (temporary mobile subscriber identity). Also when RRC connection is established between BSN 5 and MT 1, BSN 5 allocates U-RNTI (UTRAN radio network temporary identifier) for the MT 1. Radio bearers have their radio bearer ID, and logical & Transport channels their respective IDs as defined in 3GPP specifications.

When data is transmitted to and from the MT 1 the MTs UMTS identifier U-RNTI is mapped to the current IP address of the MT allocated by the BAN network 12. This mapping is established at RRC connection setup when the U-RNTI is allocated and updated at every change of U-RNTI or MTs 1 IP address e.g. during Cell Update.

Before MT 1 can connect to the UTRAN 8 it must acquire IP address from BAN network 12, e.g. from a DHCP server within BAN gateway 3. In addition to IP address the MT 1 must acquire UMTS network Information from BAN network 12. This can be realised e.g. by DHCP protocol or by other means for solicitating and receiving specific information from access network. The allocated IP address may be IPv4 or IPv6 address and it may be public or a private address.

At UTRAN 8 side all UMTS data is sent via specific transport channel. When the RRC connection is being established or re-established the used transport channel is the one intended to carry common control channel (CCH) messages. When the connection is established the UMTS dedicated transport channels (DCH) may be used.

Over BAN network 12 it is preferable that all UMTS traffic is carried via one UDP/IP tunnel. A UDP port number is preferably registered for this use. UTRAN 8 needs to multiplex the different UMTS data streams, such as logical or transport channels, to the common UDP tunnel. For this purpose a specific multiplexing protocol exists in UTRAN. The UMTS data units multiplexed to the BAN transport bearer are identified by normal UMTS identification means, i.e. RLC and PDCP headers.

In case of allocating private IP addresses for the MTs 1 in the BAN network 12, network address translation needs to be performed between BAN network 12 and UTRAN 8.

Furthermore, agreement has to be reached with regard to the connectivity to UTRAN 8 and the billing of it. As an example, the BAN provider may bill the UMTS operator for the transport resources used to convey UMTS data streams between terminal devices 1 and the operators UMTS network 15 for users connected to the UTRAN 8 via the BAN network 12.

After the IP connection between the mobile terminal 1 and the BSN 5, both the access point 2 and the BSN 5 can start collecting billing information according to the billing principles agreed between the operators.

BAN network 12 provides add on radio capacity to UTRAN 8 and UMTS network 15 in hotspot areas, like homes, hotels, department stores, cafeterias etc. owned by a certain premises owner. The coverage of the BAN access or IP access to UTRAN 8 is thus assumed to be limited to a specific, rather small, area and the handovers between the UTRAN 8 and BAN network 12 are not required to be completely unnoticeable for real time services.

For single mode terminals capable of connecting only via certain type of BAN networks 12 full mobility is not thus provided, but connectivity is only available when locating within one of those compatible BAN network 12 coverage areas.

Following assumptions are made of the BAN network 12:
Each Access Zone is represented for the MT 1 as a group of access points 2
All APs 2 within one Access Zone belongs to the same BAN Network 12
All APs 2 within same Access Zone are connected to the same UTRANs 8
APs 2 are capable of broadcasting some kind of Network ID (IP Access Zone ID or BAN zone ID) by radio technology specific broadcast signal which can be decoded by the MTs 1 when background scanning handover candidate APs 2 mode while actively communicating with other AP 2.

MT 1 is able to measure available WLAN or Bluetooth® radio signals. When a WLAN or Bluetooth® signal is found the information of it is stored in the MT 1. The in-formation of the signal consists at least of signal strength and network name. The measurements for finding broadband radio signals may be always on or they may be manually activated by the user.

When user desires to connect to UTRAN 8 via BAN network 12 user can select 'BAN Access' menu item from the MT 1. The MT 1 displays the available broadband connections and user should select connection from where it knows the UMTS access to be available. Note that in the initial system phase it is assumed that there is no specific indication of this in the information that would be known by the MT 1 at this phase.

User selects the desired BAN network 12 from the list and the MT 1 acquires IP address from the DHCP server and gets the UMTS information from the BAN network 12. The DHCP server is preferably the BANGW 3. If a suitable PLMN is available from the accessed network the MT 1 connects to the UMTS infrastructure by setting up a RRC connection. If the selected BAN network does not support connectivity to UTRAN 8, the user is informed of this and asked to make a new selection.

User may have the choice of storing this network as an BAN network 12 (based on the network name) to which he desires to always log on, if located within the coverage. If this option is selected, the next time user comes to the coverage of this network the MT 1 automatically selects to connect to UTRAN via this BAN network 12. Automatic selection should be activated for networks, which are frequently used by the user e.g. the home and office network.

When the broadband radio measurements are enabled in the MT 1 and when MT detects a signal from an AP 2 broadcasting a network name being in the MTs list of automatically selectable BAN network 12, the MT can automatically camp on to UTRAN 8 via this network. Optionally the user can be prompted to confirm this selection. When MT 1 is camped on the BAN network 12 and the coverage is lost, the MT 1 may automatically camp on the available wide area network, i.e. UTRAN or GERAN.

Seamless handovers are possible within one BAN network 12 or from an BAN network to Wide area system (UTRAN, GERAN or IP RAN). Handovers within BAN network 12 are of forward type and realised by the UMTS Cell Update procedure for RRC Connection re-establishment. The same mechanism can be used for BAN network to UTRA handovers, but also the conventional backward inter system handover is applicable, providing that the MT 1 is able to measure the available UTRA cells while connected to UTRAN 8 via BAN network 12.

When MT 1 is connected to UTRAN 8 via BAN network 12 the MT scans for the availability of other access points 2. When a stronger AP 2 is found and the changing of the AP 2 becomes beneficial from the radio point of view, MT 1 should initiate a handover to the new AP 2.

To enable seamless fallback handovers to wide area system the MT 1 should measure the available UTRAN or GERAN cells while connected to UTRAN via BAN network 12. When BAN network 12 signal becomes weak, the MT 1 should initiate handover to wide area system.

When mobile terminal 1 has decided to switch to an AP 2 which broadcasts the same network operator ID than the previous AP 2, the MT 1 can maintain its old IP address and connect directly the UTRAN 8 by cell update. It is assumed that one Access Zone (i.e. APs 2 broadcasting the same Network Operator ID) are connected to the same BSN 5.

During the intra BAN network 12 handover following actions are done:
- MT 1 abandons the old AP 2
- MT 1 establishes a radio connection with the new AP 2
- MT 1 sends IP datagram to the BSN 5. This IP datagram contains RRC message Cell Update.
- BSN 5 responds to MT 1 by Cell Update Response and communication can continue.

When MT 1 has decided to switch from current BAN AP 2 to an AP 2 broadcasting a different network operator ID, the MT 1 has to acquire new IP address, check the system information and only after that connect to the UTRAN 8.

In Inter Access Zone handover following actions are done:
- MT 1 abandons the old AP 2
- MT 1 establishes a radio connection with the new AP 2
- MT 1 acquires a new IP Address via the new AP 2
- MT 1 receives the UMTS network information from the BANGW 3
- MT 1 sends IP datagram to the BSN 5 (the address provided in the UMTS network information. This IP datagram contains RRC message Cell Update.
- BSN 5 responds to MT 1 by Cell Update Response and communication can continue.

If MT 1 is able to measure the UTRA cells while connected via BAN access, then the MT 1 can initiate the handover to wide area system by Cell Update (RRC Connection Re-establishment) similarly as between BAN network 12 access points 2. If MT 1 is able to report the UTRAN measurement results to UTRAN while connected via BAN network 12, then backward inter system handovers as defined for UMTS can be executed.

In the following several examples of Handover from/to Wide-Area Access Network to/from BAN network are presented.

EXAMPLE 1

User switches his/her MT 1 on at his/her home. Within the apartment there is a home gateway accessible via Bluetooth® and connected to the UTRAN 8 via BAN Network 12 provided by the ADSL provider 'ADSL Y' utilised by the user for connecting to external networks. In this example MT 1 camps automatically to WCDMA radio network and users selects 'BAN Access' Menu from the user interface of MT 1. User sets the MT 1 to mode 'Show available BAN Accesses'. A banner appears to MT 1 display. Soon the MT 1 has found the signal from the home gateway and shows 'User X Nw' name in the available BAN Access banner on MT 1 display.

User manually selects to log on to the UTRAN 8 via the indicated BAN Access network 12. MT 1 indicate that the connection is established via Local BAN access network 12. User X Nw is shown on display.

EXAMPLE 2

User makes a call and during the call user has to leave for office. MT 1 automatically hands over to WCDMA wide area coverage when user loses the home gateway coverage. In the switch to wide area the possible wide band connections are downgraded to more narrowband connections. User terminates the call while connected via WCDMA.

EXAMPLE 3

User arrives to office and because user has activated the showing of available BAN accesses, soon after entering the building the MT 1 displays 'Office Z Nw' as an available BAN Access. User selects to log on to UTRAN 8 via that BAN network 12 and MT 1 shows 'Office Z nw' on the display. At office the Office Z Access Zone consists of several APs 2 and users seamlessly hands over between them while moving within office premises.

EXAMPLE 4

When user leaves office, mobile terminal 1 automatically switches back to WCDMA coverage and switches to IDLE mode.

EXAMPLE 5

User goes to a cafeteria which offers UMTS services via BAN network 12. User decides to watch some news videos in Cafeteria. The MT 1 already shows the 'Cafeteria C' as an available BAN network 12. User activates the log on to the network. While watching news, user receives a call from home (from UTRAN via BAN network).

In the examples 1-5 above the handovers may be indicated to the user for example by a tone from the MT 1, an change of colour of the mobile terminal's display or/and text in the display.

BAN network 12 contains means by Which the UMTS network information is delivered from BAN network 12 to MT 1 after MT 1 has acquired an IP address from the BAN network 12.

The information delivered to the mobile terminal 1 from the BAN network 12 (preferably from access network device BANGW 3) comprises at least some of the following information:

List of PLMN-IDs of accessible cellular networks 8 via this BAN network 12.

IP Address of the BSN 5 from each PLMN.

System information package from each PLMN. In case the second access network is UTRAN, the System information package is UTRAN RRC System Information message. This system information is similar to the system information user equipments of UMTS receive from a broadcast signal.

Based on this information the accessed MT makes the PLMN selection and then contacts the BSN 5 of the selected network. MT 1 becomes also aware of the necessary system information of the selected PLMN.

BAN network 12 is used to carry the UMTS data between the BSN 5 of the UTRAN 8, and terminal device 1. The UMTS data comprises both user plane data and signalling of the UTRAN 8. The UMTS data is carried between MT 1 and BSN 5 within UDP tunnel. All UMTS data streams are preferably multiplexed into the UDP tunnel. This means that no UMTS specific functions are required by BAN network 12.

To enable easy introduction of the BAN network 12, no major changes to the UMTS UTRAN protocols are desired. Also the same functionality as in UTRAN can be reused and no new mechanisms are necessarily brought to the system from outside. The UMTS protocols are used in such an extent that smooth RRC level 'handovers' or rather connection re-establishments are feasible between BAN network 12 and the second network 8. The second network 8 may be UTRAN, GERAN or All IP RAN. This requires usage of the compatible Radio Bearer concept, PDCP operation, encryption/decryption mechanisms as well as compatible mobility & session management and call control.

Further, it is one intention of the invention that the existing protocols can be reused as now defined, although some restriction to their usage are set. This kind of restrictions are e.g. disabling some of the protocol functions, ignoring (not using) some of the protocol messages and ignoring specific information elements within the UTRAN protocol messages. Also some simplifications of the protocol operations are foreseen necessary to get the processing requirements and overhead values to reasonable levels.

UTRAN 8 has to provide multiplexing of UMTS data streams into BAN transport bearer e.g. UDP tunnel. This multiplexing protocol operation over BAN network 12 is straightforward. Sending multiplexing protocol entity performs the following functions at reception of higher layer PDU (protocol data unit):

reception of SDU (service data unit) from higher layer logical channel entity.

encapsulating the SDU into multiplexed-PDU by insertion of multiplexing header.

forwarding the PDU to the lower layer (lower layer entity encapsulates then this PDU into single UDP datagram)

Receiving side multiplexing protocol performs the reverse functions upon reception of a PDU from the lower protocol layer.

From radio link control (RLC) following functions are used:

Encapsulating RLC-SDUs into acknowledged mode or unacknowledged mode RLC PDUs encryption/decryption of the produced RLC PDUs retransmission of erroneous acknowledged mode RLC PDUs in acknowledged mode.

RLC is not required to make any segmentation of RLC-SDUs. The processing of the RLC-SDUs can be done asynchronously, not according to the frame clock.

RLC over BAN network 12 may operate only in acknowledged or unacknowledged mode. Transparent mode shall not be used due to inadequate support from the lower layers. The frame sizes for the RLC over BAN network are not constrained by the lower layers and they can thus vary from PDU to PDU. This removes the need to perform any RLC level segmentation for RLC-SDUs.

Encryption/decryption function of RLC is utilised over BAN network as defined in 3GPP specifications.

The sending side RLC performs following functions at reception of higher layer PDU:

Reception of RLC-SDU from higher layer

Encapsulating the RLC-SDU to a RLC-PDU (generally without any segmentation)

Encryption of the produced RLC-PDU

Forwarding the RLC-PDU to the local multiplexing layer

The sending side acknowledged mode RLC performs the following functions at reception of ARQ (automatic repeat request) feedback message from the peer:

Forwarding the RLC-PDUs requested to be retransmitted to the local multiplexing layer.

The receiving RLC performs the following functions at reception of a PDU from lower layer:

Reception of RLC-PDU from local multiplexing layer together with the CRC check result ARQ processing of the received RLC-PDU (only acknowledged mode)

Decryption of the correctly received RLC-PDU

Decapsulation of the correctly received RLC-PDU to a RLC-SDU

Forwarding the RLC-SDU to the higher layer

The Packet Data Convergence Protocol (PDCP) packet header compression protocol is utilised over IP Access as defined for UTRAN in 3GPP specifications.

UTRAN radio resource control (RRC) is reused over BAN network 12 to realize the support the system functions handled by RRC. All RRC signalling executed over BAN network 12 is exactly the same as over WCDMA UTRA. Some of the RRC message parameters are ignored in user plane while connected via BAN access. This kind of parameters are all transport and physical channel parameters. The transport channel and physical channel parameters should not however be removed from the RRC signals, but just silently ignored in user plane over BAN net-work 12. In this way the signalled parameters can be immediately taken into use when handing over to UTRAN.

Over BAN network 12 the network side never executes handovers (except the possible intersystem handover from BAN network 12 to UTRAN or other integrated radio access or second access network 8). The MT should be adapted to switch the AP 2 and initiate RRC Connection Re-establishment via the new AP 2 always when the access connection should be switched to new access point 2.

For every UMTS data stream conveyed via the BAN network 12, an always on IP connection is established. It is noted that one UMTS data stream can carry information belonging to one or several UMTS radio bearers. All data that is exchanged between the BSN 5 and the mobile terminal 1, i.e. both UMTS user plane and UMTS control plane data, is transmitted through the BAN network 12 on this IP transport.

FIG. 3 shows the protocol stacks of the Access Stratum User Plane between the mobile terminal 1 and the service node (BSN) 5. A stratum defines a grouping of protocols related to one aspect of the services provided by one or several highest-level groups of physical entities. The access stratum is a functional grouping consisting of the parts in the infrastructure and in the terminal device 1 and the protocols between these parts specific to the access technique, i.e. the way the specific physical media between the terminal device 1 and the infrastructure are used to carry information. The access stratum provides services related to the transmission of data over the radio interface and the management of the radio interface to the other parts of the UTRAN 8. As can be gathered from FIG. 3, the user plane connection is directly established between the terminal device 1 and the service node 5 by the air interface protocol layer UMTS RLC.

In the FIG. 3 the protocols above the UMTS RLC (shown in FIGS. 4 and 5) are shared between the first access network (BAN network) 12 and the second access net-work (UTRAN) 8. This means that the protocol layers above UMTS RLC layer are the same as used in UTRAN 8 between an user equipment connected via node B 22, and RNC 21. Further the FIG. 3 shows the multiplex layer below the UMTS RLC layer. The functions of multiplex layer have been explained earlier in this application. The layer UDP/IP is below the multiplex layer and above the protocol layers 2 and 1 (L2+L1). UDP over IPv6 (or IPv4) transport (UDP/IP) is used to transport multiplexed UMTS transport channel data streams originating/destined to the UMTS stack. It should be noticed that the protocol layers L2+L1 may be different between different devices or network elements. The interface between the terminal device (MT) 1 and the access device (AP) 2 is preferably radio interface. Thus the L2+L1 are based on Wireless technigues like WLAN or Bluetooth®. However the invention is not restricted to these techinigues, e.g. fixed connection may be used also between MT 1 and AP 2. The L2+L1 layers between AP 2 and the access network device (BANGW) 3, as well as the layers L2+L1 between the BANGW 3 and the service node (BSN) 5 are usually implemented based on fixed transport technigues.AP 2 provides only standard connectivity between the access interface (towards the MT 1) and the connected network interface (towards BANGW 3). Depending on the type of the AP 2 the standard mapping between these interfaces may be done at link layer (e.g. Ethernet bridging) or in network layer (IPv6 (/IPv4) routing). Note that the AP 2 might be connected also to other networks than to the BAN network 12.

BSN 5 is the UTRAN edge node towards the first access network 12. BSN 5 communicates with the MT 1 by the UMTS protocol stack running on top of UDP/IP transport via BANGW 3 in BAN network 12.

FIG. 4 shows the protocol stacks for the Non Access Stratum User Plane between the mobile terminal 1 and the GGSN 7. In this case, a connection is established via the BAN network 12, the SGSN 6 and the GGSN 7 of the UMTS backbone network 14 to an external network such as the Internet 10. The Access Stratum User Plane indicated in FIG. 4 is used to route the call to the BSN 5. The Access Stratum User Plane is the protocol stack presented in the FIG. 3. Based on the higher UMTS PDCP layer in the BSN 5, a mapping to the GPRS protocol layers GTP-u (GPRS Tunneling Protocol), Iu FP (Frame Protocol) and Iu transport bearer is achieved. At the SGSN 6, the Iu FP layer and the Iu Transport Bearer layer are mapped to the transport bearer of the external network. GTP-U protocol block sends and receives the UMTS user plane data to and from SGSN 6. BSN 5 signals with SGSN 6 by utilising standard RANAP protocol and can signal with other BSN 5 and UTRAN RNC's by RNSAP signalling protocol.

Furthermore, the Access Stratum Control Plane shown in FIG. 5 provides an additional higher layer UMTS RRC for the radio resource control function at the mobile terminal 1 and the BSN 5. In case of the UMTS Non Access Stratum Control Plane shown in FIG. 6, additional higher layer UMTS mobility management (MM) and UMTS session management (SM) UMTS functions are provided in an additional higher protocol layer at the mobile terminal 1 and the SGSN 6. Furthermore, the BSN 5 is arranged to map the protocol layers of the Access Stratum Control Plane to a Radio Access Network Application Part (RANAP) layer and a Iu signaling bearer required for the corresponding control signaling.

The present invention can be applied to any access system where a terminal device is to be connected to a second access network via an first access network. Furthermore the terminal device may utilise services of networks beyond the second access network, e.g. packet or circuit switched core or backbone networks. The description of the preferred embodiment is only intended to illustrate the present invention. The preferred embodiments may thus be modified within the scope of the attached claims.

The invention claimed is:

1. A method comprising:
    storing second access network information in an access network device belonging to a first access network, said second access network information comprising information of at least one second access network accessible from said first access network;
    establishing communication between a terminal device and said first access network;
    delivering the second access network information from said access network device to said terminal device; and
    providing access from the terminal device to the second access network, wherein said providing comprises accessing said second access network via said first access network, said accessing done based on the second access network information delivered to said terminal device,
    wherein said second access network information comprises a list of public land mobile network identifiers of accessible second access networks.

2. A method according to claim 1, wherein said terminal device is connected to the first access network via an access device and said establishing of communication comprises an establishment of the radio interface connection between said terminal device and said access device.

3. A method according to claim 1, wherein the method further comprises:
    allocating an internet protocol address to the terminal device.

4. A method according to claim 1, wherein said first access network uses wireless local area network, orthogonal frequency division multiplexing or personal area network-based radio technology.

5. A method comprising:
- storing second access network information in an access network device belonging to a first access network, said second access network information comprising information of one or more second access networks accessible from said first access network;
- establishing communication between a terminal device and said first access network;
- delivering the second access network information from said access network device to said terminal device; and
- providing access from a terminal device to a second access network, wherein said providing comprises accessing said second access network via said first access network, said accessing done based on the second access network information delivered to said terminal device,
- wherein said second access network information comprises internet protocol address of a service node.

6. A method according to claim 5, wherein said terminal device is connected to the first access network via an access device and said establishing of communication comprises an establishment of the radio interface connection between said terminal device and said access device.

7. A method according to claim 5, wherein the method further comprises allocating an internet protocol address to the terminal device.

8. A method according to claim 5, wherein said first access network uses wireless local area network, orthogonal frequency division multiplexing or personal area network -based radio technology.

9. A method comprising:
- storing second access network information in an access network device belonging to a first access network, said second access network information comprising information of a second access network accessible from said first access network;
- establishing communication between a terminal device and said first access network;
- delivering the second access network information from said access network device to said terminal device; and
- providing access from the terminal device to the second access network comprising accessing said second access network via said first access network, said accessing done based on the second access network information delivered to said terminal device,
- wherein said second access network information comprises system information package from each accessible second access network.

10. A method according to claim 9, wherein said terminal device is connected to the first access network via an access device and said establishing of communication comprises an establishment of the radio interface connection between said terminal device and said access device.

11. A method according to claim 9, wherein the method further comprises allocating an internet protocol address to the terminal device.

12. A method according to claim 9, wherein said first access network uses wireless local area network, orthogonal frequency division multiplexing or personal area network -based radio technology.

13. A method comprising:
- storing second access network information in an access network device belonging to a first access network, said second access network information comprising information of a second access network accessible from said first access network;
- establishing communication between a terminal device and said first access network;
- delivering the second access network information from said access network device to said terminal device; and
- providing access from a terminal device to a second access network, wherein said providing comprises accessing said second access network via said first access network, said accessing done based on the second access network information delivered to said terminal device,
- wherein said accessing of the second access network comprises establishing a connection between the terminal device and a service node of the second access network, and
- wherein said connection is used to transport radio resource control connection between the terminal device and the service node.

14. A method according to claim 13, wherein said connection is maintained as long as the terminal device is in the coverage area of the first access network.

15. A method comprising:
- storing second access network information in an access network device belonging to a first access network, said second access network information comprising information of a second access network accessible from said first access network;
- establishing communication between a terminal device and said first access network;
- delivering the second access network information from said access network device to said terminal device; and
- providing access from a terminal device to a second access network, wherein said providing comprises: accessing said second access network via said first access network, said accessing done based on the second access network information delivered to said terminal device, and
- handing over between a first and a second access devices by:
  - abandoning the communication between the first access device and the terminal device,
  - establishing a new communication between the second access device and the terminal device, and
  - sending a signaling message to a service node from the terminal device.

16. A method comprising:
- storing second access network information in an access network device belonging to a first access network, said second access network information comprising information of a second access network accessible from said first access network;
- establishing communication between a terminal device and said first access network;
- delivering the second access network information from said access network device to said terminal device; and
- providing access from a terminal device to a second access network, wherein said providing comprises:
- accessing said second access network via said first access network, said accessing done based on the second access network information delivered to said terminal device, and
- handing over from a first to a second access devices by:
  - abandoning the communication between the first access device and the terminal device,
  - establishing a new communication between the second access device and the terminal device,
  - allocating an internet protocol address to the terminal device,
  - delivering of second access network information to the terminal device, and
  - sending a signaling message to a new service node from the terminal device.

17. A method comprising:
- storing second access network information in an access network device belonging to a first access network, said second access network information comprising information of a second access network accessible from said first access network;
- establishing communication between a terminal device and said first access network;
- delivering the second access network information from said access network device to said terminal device; and
- providing access from a terminal device to a second access network comprising accessing said second access network via said first access network, said accessing done based on the second access network information delivered to said terminal device,
- wherein the data transmitted between said terminal device and said second access network comprises of protocol data units, and
- wherein said protocol data units are radio link control data units.

18. A method according to claim 17, wherein the protocol data units are multiplexed into a data stream between the second access network and terminal device by a multiplexing protocol.

19. A method according to claim 17, wherein the protocol data units are transported over the first access network via a user datagram protocol/internet protocol tunnel.

20. A system comprising:
- a first access network configured to provide communications to a terminal device; and
- an access network node belonging to said first access network, said access network node configured to provide access from the terminal device to a second access network accessible from said first access network and further configured to store and deliver second access network information to said terminal device, said second access network information comprising information of the second access network,
- wherein said second access network information comprises information configured to enable the terminal device to access said second access network via said first access network, wherein said second access network information comprises a list of public land mobile network identifiers of accessible second access networks.

21. A system according to claim 20, wherein said first access network further comprises an access device configured to connect said terminal device to the first access network according to the access specifications of said first access network.

22. A system according to claim 21, further comprising an establishment of the radio interface connection between said terminal device and said access device.

23. A system according to claim 20, wherein said first access network is configured to use wireless local area network, personal area network, or orthogonal frequency division multiplexing based radio technology.

24. A system comprising:
- a first access network configured to provide communications to a terminal device; and
- an access network node belonging to said first access network, wherein said access network node is configured to provide access from the terminal device to a second access network accessible from said first access network and to store and deliver second access network information to said terminal device, said second access network information comprising information of said second access network;
- wherein said second access network information comprises information enabling the terminal device to access said second access network via said first access network, wherein said second access network information comprises internet protocol address of a service node.

25. A system according to claim 24, wherein said first access network further comprises an access device configured to connect said terminal device to the first access network according to the access specifications of said first access network.

26. A system according to claim 25 further comprising a radio interface connection established between said terminal device and said access device.

27. A system according to claim 24, wherein said first access network is configured to use wireless local area network, personal area network, or orthogonal frequency division multiplexing based radio technology.

28. A system comprising:
- a first access network configured to provide communications to a terminal device; and
- an access network node belonging to said first access network and configured to provide access from the terminal device to second access networks accessible from said first access network and to store and deliver second access network information to said terminal device, said second access network information comprising information of the second access networks,
- wherein said second access network information comprises information configured to enable the terminal device to access each of said second access networks via said first access network, wherein said second access network information comprises system information package from each of said accessible second access networks.

29. A system according to claim 28, wherein said first access network further comprises an access device configured to connect said terminal device to the first access network according to the access specifications of said first access network.

30. A system according to claim 29 further comprising a radio interface connection established between said terminal device and said access device.

31. A system according to claim 28, wherein said first access network is configured to use wireless local area network, personal area network, or orthogonal frequency division multiplexing based radio technology.

32. A system comprising:
- a first access network configured to provide communications to a terminal device; and
- an access network node belonging to said first access network, wherein said access network node is configured to provide access from the terminal device to a second access network accessible from said first access network and to store and deliver second access network information to said terminal device, said second access network information comprising information of said second access network; and said second access network information comprising information enabling the terminal device to access said second access network via said first access network, wherein said access network device is configured to allocate an internet protocol address to the terminal device.

33. A system comprising:
- a first access network configured to provide communications to a terminal device; and an access network node belonging to said first access network, wherein said access network node is configured to provide access from the terminal device to second access networks and to store and deliver second access network information to said terminal device, said second access network information comprising information of one of said second access networks that is accessible from said first access network; and said second access network information comprising information enabling the terminal device to access said accessible second access network via said first access network, wherein said accessing said second access network comprises establishing of a connection between said terminal device and a service node of said accessible second access network; and wherein said connection is configured for radio resource control connection between said terminal device and said accessible service node.

34. A system according to claim 33, wherein said connection is maintained as long as said terminal device is in the coverage area of said first access network.

35. A system, comprising:

a first access network configured to provide communications to a terminal device; and an access network node belonging to said first access network, wherein said access network node is configured to providing access from the terminal device to a second access network accessible from said first access network and to store and deliver second access network information to said terminal device, said second access network information comprising information of said second access network; and said second access network information comprising information enabling the terminal device to access said second access network via said first access network, wherein data transmitted between said terminal device and said second access networks comprises of protocol data units; and wherein said protocol data units are radio link control data units.

36. A system according to claim 35, wherein said service node and the terminal device are configured to multiplex said protocol data units into a data stream between said service node and said terminal device by a multiplexing protocol.

37. A system according to claim 35, wherein said protocol data units are transported over said first access network via a user datagram protocol/internet protocol tunnel.

38. An apparatus, comprising:

storage configured to store second access network information; and communications circuitry configured to enable a terminal device connected to a first access network to access a second access network accessible from the first access network and configured to deliver said second access network information to said terminal device, said second access network information comprising information of said second access network; and said second access network information comprising information enabling the terminal device to access said second access network via said first access network; wherein said second access network information comprises a list of public land mobile network identifiers of accessible second access networks.

39. An apparatus according to claim 38, wherein said apparatus belongs to said first access network.

40. An apparatus according to claim 38, wherein said apparatus is configured to allocate an address to said terminal device.

41. An apparatus comprising:

storage configured to store a second access network information; and a transceiver configured to enable access from a terminal device connected to a first access network to a second access network accessible from the first access network and further configured to deliver said second access network information to said terminal device, said second access network information comprising information of said second access network, wherein said second access network information comprising information enabling the terminal device to access said second access network via said first access network; wherein said second access network information comprises internet protocol address of a service node.

42. An apparatus according to claim 41, wherein said apparatus belongs to said first access network.

43. An apparatus comprising:

memory configured to store a second access network information; and communications circuitry configured to enable access from a terminal device connected to a first access network, to a second access network accessible from the first access network and further configured to deliver said second access network information to said terminal device, said second access network information comprising information of said second access network, wherein said second access network information comprising information enabling the terminal device to access said second access network via said first access network;

wherein said second access network information comprises system information package from each accessible second access network.

44. An apparatus according to claim 43, wherein said apparatus belongs to said first access network.

* * * * *

UNITED STATES PATENT AND TRADEMARK OFFICE
CERTIFICATE OF CORRECTION

| | | |
|---|---|---|
| PATENT NO. | : 7,551,576 B2 | Page 1 of 1 |
| APPLICATION NO. | : 10/467276 | |
| DATED | : June 23, 2009 | |
| INVENTOR(S) | : Kalle Ahmavaara | |

It is certified that error appears in the above-identified patent and that said Letters Patent is hereby corrected as shown below:

Title page, item (73) Assignee: should read as follows: Nokia Siemens Networks Oy Signed and Sealed this
Seventh Day of June, 2011

David J. Kappos
*Director of the United States Patent and Trademark Office*